United States Patent [19]

Westermayer

[11] 4,323,729

[45] Apr. 6, 1982

[54] CIRCUIT ARRANGEMENT FOR THE CONTROL OF A CRYPTO OPERATION IN THE CASE OF PROCEDURE-CONTROLLED SEMI-DUPLEX DATA TRANSMISSION SYSTEMS

[75] Inventor: Joerg Westermayer, Munich, Fed. Rep. of Germany

[73] Assignee: Siemens Aktiengesellschaft, Berlin & Munich, Fed. Rep. of Germany

[21] Appl. No.: 659,968

[22] Filed: Feb. 19, 1976

[30] Foreign Application Priority Data

Feb. 24, 1975 [DE] Fed. Rep. of Germany ....... 2507803

[51] Int. Cl.³ .............................................. H04L 9/00
[52] U.S. Cl. .................................. 178/22.01; 178/2 R
[58] Field of Search ..................... 178/58 A, 58 R, 22, 178/2 R; 340/146.2; 343/228, 226, 225

[56] References Cited

U.S. PATENT DOCUMENTS 3,395,245  7/1968  Harris ................................. 178/2 R

*Primary Examiner*—Howard A. Birmiel
*Attorney, Agent, or Firm*—Hill, Van Santen, Steadman, Chiara & Simpson

[57] ABSTRACT

A crypto control circuit arrangement is disclosed for controlling crypto operation in the case of procedure-controlled semi-duplex data transmission systems in which data are transmitted from a first station with a first data device and a first crypto device, via a transmission path, to a second station having a second crypto device and a second data device. The changes of the data transmission direction are signaled with an order word which is transmitted from the first crypto device to the second crypto device and is evaluated with the help of an order evaluator. A control signal is emitted at the output of the second data device which prepares the second crypto device for the transmission when an end signal is transmitted from the first data device to the second data device. The output of the order evaluator and the output of the second data device are connected with inputs of a gate and a stop signal is only emitted toward a decoding device of the second crypto device by way of the gate when, on one hand, a received order is recognized with the help of the order evaluator and, on the other hand, the control signal indicates the end of the data transmission from the first station to the second station.

1 Claim, 2 Drawing Figures

CIRCUIT ARRANGEMENT FOR THE CONTROL OF A CRYPTO OPERATION IN THE CASE OF PROCEDURE-CONTROLLED SEMI-DUPLEX DATA TRANSMISSION SYSTEMS

BACKGROUND OF THE INVENTION

1. Field of the Invention

This invention relates to a circuit arrangement for the control of crypto operation in the case of procedure-controlled semi-duplex data transmission systems, and is more particularly concerned in such systems in which data are transmitted from the first station with a first data device and a first crypto device, via a transmission path, to a second station having a second crypto device and a second data device. Changes in the data transmission direction are signaled with an order which is transmitted from the first crypto device to the second crypto device and which is evaluated with an order evaluator. A control signal is emitted by way of an output of the second data device, whereby the control signal prepares the second crypto device for transmission when an end character is transmitted from the first data device to the second data device.

2. Description of the Prior Art

In the case when data is to be transmitted from the first station to a second station within the framework of a procedure control and in the case of semi-duplex operation, a starting character is first transmitted and the data then follows. Then, an end character from which the second station can recognize the end of the data transmission in this transmission dlirection is emitted. In order to signal a transmission direction change effected hereafter, an order word is transmitted from the first crypto device to the second crypto device, and thus the crypto generators of both stations are stopped in a character correct manner. During the transmission of desired bit flows, it cannot generally be prevented that bit patterns occur which are accidentally equal to the order word. In the case of prior art procedure controlled data transmission systems of this kind, accidentally occurring order words cause an undesired stopping of the receiving side crypto generator, before the occurrence of the end character. Due to this undesired stopping of the receiving side crypto generator, the effectiveness of the data transmission system is lowered.

SUMMARY OF THE INVENTION

The present invention is based on the task of providing a circuit arrangement for controlling crypto operation in the case of procedure-controlled semi-duplex data transmission systems, in which order words occurring accidentally and inadvertently cannot stop the receiving side crypto generators at the wrong time.

According to the invention, the outputs of the order evaluators and the output of the second data device are connected with inputs of a gate and a stop signal is emitted to a decoder of the second crypto device, via the output of the gate, only when, on the one hand, a received order word is recognized by the order evaluator, and, on the other hand, the end of the data transmission from the first station to the second station is signaled by the control signal.

The circuit arrangement constructed in accordance with the present invention is characterized in that it permits order words occurring in the range of the second station to become effective only when the end character signals the end of the data transmission from the first station to the second station, so that a premature switching off of the crypto generator is not possible.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
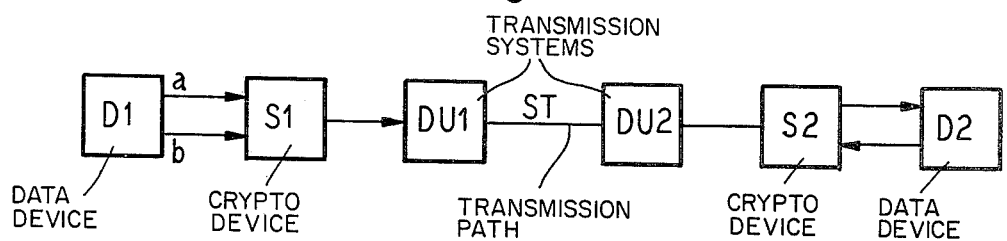
FIG. 1 is a schematic block diagram of a semi-duplex data transmission system.

FIG. 1 illustrates a procedure-controlled data transmission system which comprises a pair of data devices D1 and D2, a pair of crypto devices S1 and S2, a pair of transmission systems DU1 and DU2 and a transmission path ST. The data may be transmitted both from the data device D1 to the data device D2, as well as, alternatively, from the data device D2 to the data device D1, oppositely in a semi-duplex operation.

The data devices emit the data in the form of binary signals whose binary values are associated with two different amplitudes of the signal. The data are generally transmitted within a given bit frame and within a given character frame. Thereby, a character may, for example, consist of 8 bits. When the data are transmitted from the data device D1 to the data device D2, the data will be encoded in the crypto device S1, and decoded in the crypto device S2. If, oppositely, the data are transmitted from the data device D2 to the data device D1, then the data are encoded in the crypto device S2 and decoded in the crypto device S1.

A telephone line, an ultra-short wave radio path or a directional radio path may be provided as the transmission path ST. The transmission systems DU1 and DU2 are adapted to the respectively applied transmission path. Before a message can be transmitted from the data device D1 to the data device D2, the crypto device S2 must be phased with respect to the crypto device S1. If, oppositely, a message is to be transmitted from the data device D2 to the data device D1, then the crypto device S1 must be previously phased with respect to the crypto device S2.

Figure 2:
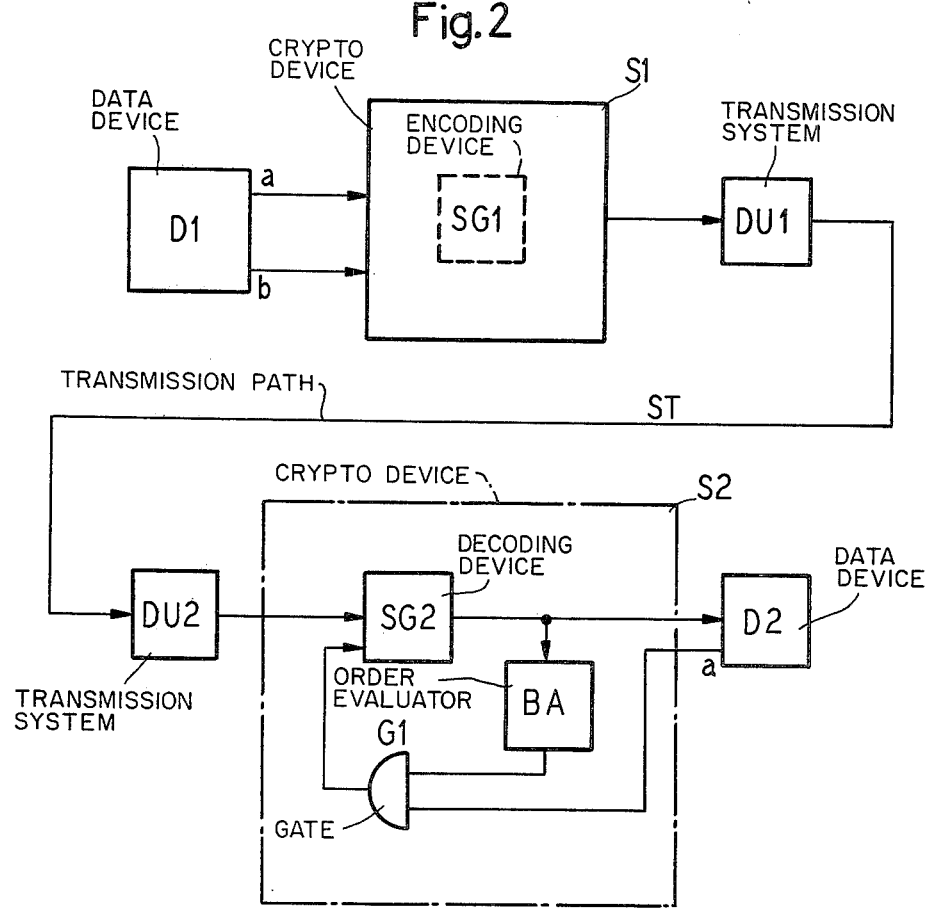
FIG. 2 is a more detailed block diagram representation of the transmission system illustrated in FIG. 1 and constructed in accordance with the principles of the present invention.

FIG. 2 illustrates in more detail a procedure-controlled data transmission system, in which, in addition to the previously mentioned components, the encoding device SG1, the decoding device SG2 the order evaluator BA and the gate G1 have been illustrated.

Before data can be transmitted from the data device D1 to the data device D2, the crypto device S2, as previously mentioned, must be phased from the crypto device S1. This is caused by a first control signal "transmission" which reaches the crypto device S1 from the data device D1. Before the data themselves are transmitted, a start character is transmitted from the data device D1 to the data device D2, and an end character is transmitted at the end of the data transmission. Directly hereafter, the control signal "transmission" is switched off by the data device D1, via its output b. The data device D2 recognizes the end of the data transmission due to the end character. After the reception of this end character, a second control signal "transmission" is emitted by the data device D2, via its outputs a, whereby the crypto device S2 does not switch over to transmission operation. The transmission device S1 produces an order word which is coded in the coding device SG1 and transmitted via the transmission path, and which is supplied to the order evaluator BA after the decoding in the decoding device SG2. The order evaluator BA recognizes the order word and emits a signal to the gate G1, via its output. Since the control signal "transmission" of the data device D2 is already present at the second input of the gate G1, a stop signal is emitted via the output gate G1, and is effective to stop the decoder SG2. A stop signal may thus only be emitted when the data device D2 emits the control signal "transmission". If bit patterns equal to the order accidentally during the data transmission from the data device D1 to the data device D2, then the order evaluator BA will recognize these accidentally occurring order words and will emit a corresponding output signal, but it will not cause a stopping of the decoder SG2. Along with the gate G1, the order evaluation is therefore blocked until the control signal "transmission" arrives. Faulty controls of the decoder SG2 are therefore avoided in this manner.

A decoder may, for example, be provided as the order evaluator BA, but also a comparator may be utilized which, on one hand, is continuously supplied with an order word and which, on the other hand, is connected with the output of the decoding device SG2. As soon as the words supplied to the two inputs are equal, this comparator will emit a signal toward the gate G1, and will therefore signal a recognized order word.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a procedure-controlled semi-duplex data transmission system for crypto operation in which data are transmitted from a first station with a first data device and a first crypto device via a transmission path to a second station having a second crypto device, which includes a decoding device, and a second data device, in which a change of transmission direction is signaled with an order word from the first crypto device to the second crypto device and is evaluated by an order evaluator, whereby the second data device emits a control signal to prepare the second crypto device for transmission when an end signal is received from the first data device, and in which data words inadvertently simulate change of direction order words, the improvement comprising:

gating means having an input connected to the output of the order evaluator and an input connected to the output of the second data device and an output connected to the decoder to stop operation of the decoder in response to an order word in conjunction with an end signal.

* * * * *